Jan. 6, 1959

D. J. BEECHER 2,867,100

SEAL ASSEMBLY

Filed Oct. 24, 1955

DRIVE END

INVENTOR.
DONALD J. BEECHER
BY

Jan. 6, 1959     D. J. BEECHER     2,867,100
SEAL ASSEMBLY

Filed Oct. 24, 1955            2 Sheets-Sheet 2

ROLL END

INVENTOR.
DONALD J. BEECHER
BY

United States Patent Office 2,867,100
Patented Jan. 6, 1959

2,867,100

SEAL ASSEMBLY

Donald J. Beecher, Erie, Pa., assignor to American Flexible Coupling Company, Erie, Pa., a corporation of Pennsylvania Application October 24, 1955, Serial No. 542,148

2 Claims. (Cl. 64—9)

This invention relates to seals and more particularly to seal devices for forming a seal between two coupling members.

In sealing devices for coupling members made according to prior designs, it is the customary practise to provide a packing washer and a similar device directly between two concentric members. In cases where it is necessary to form a seal between the internal gear member of the gear coupling and the hub of the external gear connected thereto, packing washers are distorted considerably at the side toward which the hub moves and the opposite side of the hub is inclined to move away from the packing washer and, therefore, allows leakage to occur.

It is, accordingly, an object of this invention to overcome the above and other defects in prior designs of sealing devices for coupling members and, more particularly, it is an object of this invention to provide a sealing device which is simple in construction, economical to manufacture, and simple and efficient to use.

Another object of the invention is to provide a sealing device for forming a seal between two members which have axes out of alignment with each other wherein a flexible boot type member reinforced by a spiral wire connects and forms a seal between the two members.

A further object of the invention is to provide a seal between two concentric members.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 3:
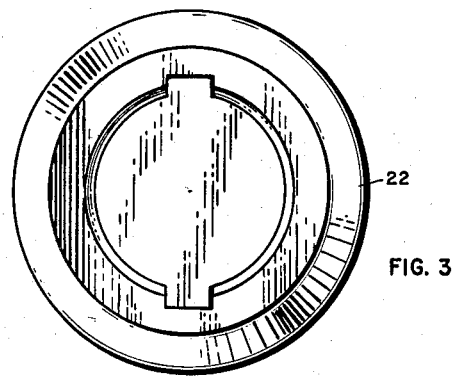
Fig. 3 is an end view of the coupling shown in Fig. 1.
Figure 1:
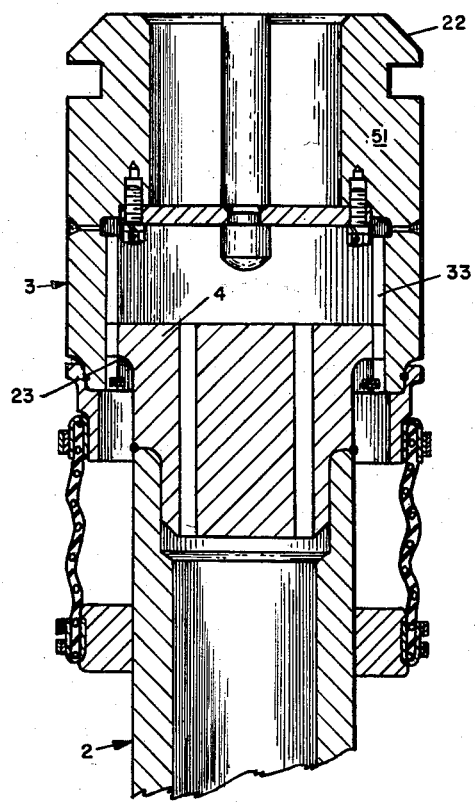
Fig. 1 is a longitudinal cross sectional view of a coupling according to the invention.
Figure 4:
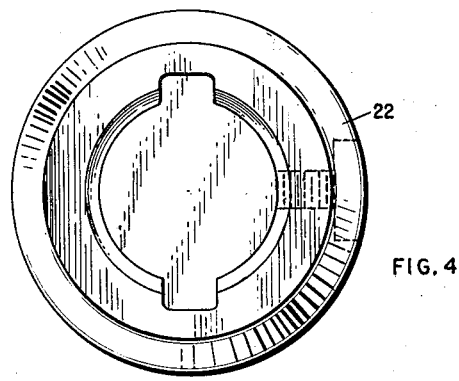
Fig. 4 is an end view of the coupling shown in Fig. 2.
Figure 2:
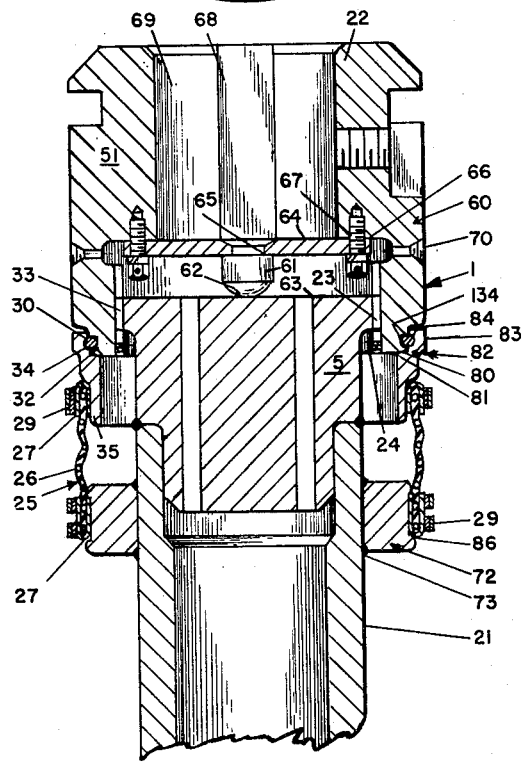
Fig. 2 is a longitudinal cross sectional view of a coupling similar to that shown in Fig. 1 adapted to be used therewith to support a roll.

Now with more specific reference to the drawings, the coupling device shown in Figs. 1 and 2 has a coupling member made up of two spaced gear couplings 1 and 3 connected by a tubular shaft 2. The shaft 2 has hubs 4 and 5 disposed one at each end thereof. The hubs 4 and 5 have external teeth 23 formed thereon which engage internal teeth 33 on sleeve member 60 having an end portion 51 suitable for attaching to a drive member. The movement of the hub 5 is limited by its engagement with an engaging member 61 which has a spherical end 62 adapted to engage an end surface 63 of the hub 5. The engaging member 61 is attached to a plate 64 at 65 and the plate 64 is held in engagement with a shoulder 66 by means of bolts 67. The ends 22 of the coupling members 1 and 3 are bored at 68 to receive the end of a member to be connected by the couplings 1 and 3 and keyways 69 are provided to prevent relative rotation between the couplings 1 and 3 and the connected member. Holes 70 are formed in the internal toothed sleeve 60 whereby lubricant can be inserted to lubricate the gear teeth 23 and 33.

The sealed member is made up of a hose or boot member 25 which may be made of neoprene, rubber, or any suitable flexible material and has a helical spring wire 26 embedded in the flexible material. The ends of the boot member 25 have a plain cylindrical member 27 which is U-shaped in cross section which receives the ends of the boot 25 between its ends. Metal bands 29 are tightened around the outside of the U-shaped member 27 to lock the flexible member 25 on a collar 72 which is welded to a shaft 21 at 73 and the other end of the flexible member 25 is held in similar manner on a collar 35. The collar 35 has a flange 82 which has a shoulder 80 which is adapted to abut against an end 81 of a sleeve 60 and a flanged portion 83 overlies a reduced size portion 84 which has a groove 32 therein adapted to receive an O-shaped washer 30. The O-shaped washer 30 likewise rests in a shallow groove 34 in the collar 35, thereby providing a seal at the end thereof. The collar 72 has a wide peripheral groove 86 in which the U-shaped member 27 is held by means of the bands 29.

One important advantage of the seal is the retaining feature of the O-shaped washer or ring 30. The O-ring 30 not only seals against loss of lubricant but, due to the groove 34 on the inside of the collar 35, the O-ring 30 acts as a retainer ring. This will prevent the sleeve 60 and collar 35 from becoming separated. In this manner, the boot 25 does not have to have axial stiffness. The retaining feature also facilitates a compact assembly by eliminating more cumbersome fasteners. The O-shaped washer 30 is dislodged by prying between collar 35, sleeve 60, and reduced size portion 84 with two screw drivers diametrically opposite disposed in the recess between the sleeve 60 and collar 35.

The external teeth 23 on the hubs 4 and 5 are crowned on their tips in the form of a section of a sphere and their flanks are crowned in a curved manner. These curved flanks could be made in the manner shown in Patent Number 2,682,760.

When a drive member is connected to the end 22 and a driven member to the end 21 of the coupling device and the drive member is out of axial or angular alignment with the axis of rotation of the member driven by end 22, there will be a relative movement between the shaft 2 and the coupling members 1 and 3. Therefore, considerable flexing will take place in the boot member 25 and the flexing thereof will be absorbed by the boot member 25 and since the boot member 25 forms sealing engagement with the collars 72 and 35, any leakage of lubricant from the teeth will be eliminated and any entrance of foreign matter thereinto also will be prevented.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a coupling for two shafts and means to attach two shafts thereto comprising a generally cylindrical member having a bore therethrough, said bore being adapted to receive one end of a shaft, said bore being counterbored at one end, a peripheral shoulder in said counterbore where said counterbore joins said bore, a plate attached to said shoulder and extending transversely of said bore, a member attached to the center of said plate and extending therefrom in said counterbore and terminating in an end having a shape conforming to a portion of a sphere, internal teeth formed in said counterbore and extending axially thereof, a hub having external teeth thereon engaging said internal teeth and axially slidable thereon, the end of said hub being generally flat and engaging said spherical surface, said hub and said cylindrical member being rotatable in axial misalignment with each other, said cylindrical member terminating at the end thereof adjacent said hub in a reduced size peripheral portion, a collar having an enlarged size diameter portion on one end, said enlarged size diameter portion receiving said reduced size peripheral portion, an external peripheral groove in said reduced size portion, an internal peripheral groove in said enlarged size portion overlying said external groove, an O-shaped washer made of resilient material in said grooves and forming a holding member holding said collar in place on said cylindrical member and forming a seal between said collar and said cylindrical member, and sealing means between said hub and said collar.

2. The combination recited in claim 1 wherein said sealing means between said collar and said hub comprises a reduced size external surface on said collar, a flexible tubular member receiving said reduced size end on said collar, a clamping band clamping said tubular member to said collar, a shaft attached to said hub, the other end of said tubular member being clamped to the periphery of said hub, and a helical spring embedded in the walls of said tubular member.

References Cited in the file of this patent
UNITED STATES PATENTS

| | | |
|---|---|---|
| 1,397,413 | Evans | Nov. 15, 1921 |
| 2,136,947 | Morgan | Nov. 15, 1938 |
| 2,372,289 | O'Malley | Mar. 27, 1945 |
| 2,486,270 | Fawick | Oct. 25, 1949 |
| 2,769,323 | O'Malley | Nov. 6, 1956 |

FOREIGN PATENTS

| | | |
|---|---|---|
| 543,733 | Great Britain | Mar. 10, 1942 |